United States Patent Office 3,639,527
Patented Feb. 1, 1972

3,639,527
POLYESTER-IONIC COPOLYMER THERMO-
PLASTIC MOULDING COMPOSITIONS
Ludwig Brinkmann and Walter Herwig, Frankfurt am
Main, Germany, assignors to Farbwerke Hoechst Aktiengesellschaft vormals Meister Lucius & Brüning,
Frankfurt am Main, Germany
No Drawing. Filed Aug. 8, 1968, Ser. No. 751,030
Claims priority, application Germany, Sept. 5, 1967,
P 16 94 190.5
Int. Cl. C08f 29/36; C08g 39/10
U.S. Cl. 260—873         13 Claims

ABSTRACT OF THE DISCLOSURE

The invention provides thermoplastic moulding compositions comprising linear saturated polyesters and ionic copolymers from which dimensionally stable shaped articles having a high impact strength can be produced.

---

It is known that thermoplastic moulding compositions of linear saturated polyesters of aromatic dicarboxylic acids can be processed to furnished mouldings.

Mouldings manufactured from unmodified polyethylene terephthalate have only limited dimensional stability because they shrink when heated to an elevated temperature, and the mouldings are thereby caused to change their shapes in an uncontrollable manner.

Various measures have been proposed to modify polyethylene terephthalate with a view to obtaining mouldings having dimensional stability from the moulding compositions thus manufactured. Inter alia, it is known from German specification 1,182,820 to mix polyesters of saturated aliphatic diols and saturated aromatic dicarboxylic acids, especially polyethylene terephthalate, with highpolymeric propylene or high-polymeric 4-methylpentene-1. The mouldings obtained from these moulding compositions have in fact an improved dimensional stability compared with mouldings made from unmodified polyethylene terephthalate, but this improved dimensional stability is still not adequate for many uses.

It has further been proposed in Dutch application 6,511,744 to admix with polyethylene terephthalate finely dispersed, solid inorganic substances capable of raising the crystallization speed of the injected polyester mass in the mould. These moulding compositions may be processed to furnish mouldings that have dimensional stability and have an impact strength that is adequate for many uses. As solid inorganic substances there have been proposed, for example, calcium carbonate, talcum, glass powder or metals. These substances, which are incompatible with the polyester mass, are effective only when they are very finely dispersed and have a grain size below $2\mu$.

The present invention provides thermoplastic moulding compositions consisting of a mixture of:

(a) Linear saturated polyesters of aromatic dicarboxylic acids and possibly a small proportion of aliphatic dicarboxylic acids with saturated aliphatic or cycloaliphatic diols and (b) Ionic copolymers of α-olefins and salts of α,β-unsaturated carboxylic acids containing ions of monovalent to trivalent metals, and, if desired, also α,β-unsaturated carboxylic acids and/or α,β-unsaturated carboxylic acid esters may be constituents of the copolymer, the amount of ionic copolymer being equal to 0.01 to 25% of the weight of the whole mixture.

The surprising fact is that by the addition of ionic copolymers to the polyester moulding compositions are obtained which during processing crystallize very rapidly in the mould to furnish mouldings having a very good dimensional stability, without impairing the hardness and abrasion resistance. It was also surprising that the impact strength of the polyesters modified in this manner is increased. The mouldings retain their dimensional stability also at temperatures above the setting temperature. The ionic copolymers to be added need not be reduced to a very small grain size before being admixed with the polyester mass; they can be so admixed in the very simple manner described below.

A preferred linear saturated polyester of an aromatic dicarboxylic acid is polyterephthalate, though other polyesters, for example polycyclohexane-1,4-dimethylol trephthalate, may likewise be used. It is also possible to use modified polyethylene terephthalates that contain in addition to terephthalic acid further aromatic or aliphatic dicarboxylic acids as basic units, for example isophthalic, naphthalenedicarboxylic-2,6-or adipic acid. Furthermore, it is possible to use modified polyethylene terephthalates that contain in addition to ethyleneglycol other aliphatic diols, for example neopentylglycol or butanediol-1,4 as alcoholic components.

The polyesters should have a reduced specific viscosity dl./g. (measured in a 1% solution in 60:40 phenol+tetrachloroethane at 25° C.) from 0.6 to 2.0, preferably from 0.9 to 1.6.

Other possible starting materials are polyesters having a lower reduced specific viscosity which are raised to the desired viscosity during the mixing operation. It is, however, also possible to further condense the thermoplastic moulding composition in solid phase by the known process until the desired reduced specific viscosity has been reached.

Numerous copolymers are suitable for use as ionic copolymers of α-olefins with α,β-unsaturated dicarboxylic acids containing metal ions of monovalent to trivalent metals. These ionic copolymers may be prepared by the known process described, for example, in Canadian specification 674,595. Suitable ionic copolymers are compounds of the following general formula

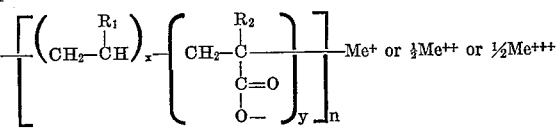

in which $R_1$ represents hydrogen, $CH_3$ to $C_{12}H_{25}$ or $C_6H_5$, $R_2$ represents hydrogen, $CH_3$ or $C_2H_5$, $Me^+$ the ion of a monovalent metal, $Me^{++}$ the ion of a bivalent metal, $Me^{+++}$ the ion of a trivalent metal, and $x$, $y$ and $n$ are digits.

It is also possible to use ionic copolymers of α-olefins with α,β-unsaturated dicarboxylic acids, for example copolymers of ethylene with maleic acid, or copolymers of ethylene with itaconic acid, that contain metal ions of monovalent to trivalent metals. Further suitable ionic copolymers are graft polymers. Such copolymers are obtained, for example, when α,β-unsaturated carboxylic acid esters are grafted on to polyolefins, then hydrolyzed and finally reacted, for example, with an alkali metal hydroxide.

The olefin share of these copolymers should be at least 50% by weight. Preferred copolymers are those which have an olefin share of 80 to 99% by weight.

Further suitable ionic copolymers are compounds containing the following units:

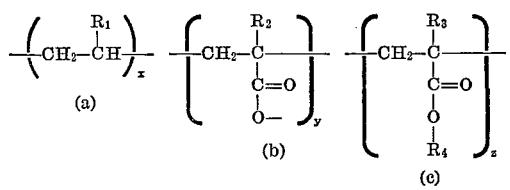

Me⁺ or ½ Me⁺⁺ or ⅓ Me⁺⁺⁺

$R_1$=H, $CH_3$ to $C_{12}H_{25}$, $C_6H_5$
$R_2$=H, $CH_3$, $C_2H_5$
$R_3$=H, $CH_3$, $C_2H_5$
$R_4$=$CH_3$ to $C_{12}H_{25}$ and in which x, y and z are digits.

The olefin share of the ionic copolymers should be at least 50% by weight; preferred copolymers are those which have an olefin share of 80 to 90% by weight. The sum of ester share and ionic share should be at least 10% by weight, the ionic share being at least 5% of the total quantity of ionic copolymer. It is not necessary for all carboxyl groups to be neutralized by metal ions, but at least 10% of the carboxyl groups should be neutralized by metal ions.

The molecular weight of the ionic copolymer should be over 5000 and preferably over 50,000.

Suitable metal ions are all those mentioned in the above cited Canadian specification 674,595. Alkali metal ions, especially sodium ions, are preferred. Preferred products are ionic copolymers of ethylene and methacrylic acid containing alkali metal ions, preferably sodium ions.

The moulding compositions of this invention contain 0.01 to 25%, preferably 0.1 to 10% by weight of the ionic copolymers.

The admixture of the ionic copolymer with the polyester mass may be carried out in various ways. Thus, for example, the ionic copolymer and the polyester may be mixed by vigorously stirring the melt. Alternatively, the polyester granulate or powder may be mixed as uniformly as possible with the powdered ionic copolymer, then melted in the extruder, expressed with cooling and granulated. The ionic copolymer may have any desired grain size.

The polyester mass should contain as little moisture as possible, preferably less than 0.01% by weight.

To reduce the moisture absorption the granulated polyester moulding composition may be provided with a coating of an inert hydrophobic substance, for example paraffin wax or another wax.

To arrive at crystalline or partially crystalline mouldings it is advantageous to maintain the moulding temperature sufficiently high above the setting temperature.

The polymer mixtures of this invention can be transformed thermoplastically into mouldings having dimensional stability and distinguished by their improved impact strength.

EXAMPLE 1

3980 grams of polyethylene terephthalate powder (reduced specific viscosity 1.43 dl./g., measured in a 1% solution in 60:40 phenol+tetrachloroethane at 25° C.; grain distribution 100–750μ) were homogenized in an extruder with 20 g. of a ionic copolymer (melt index below 0.1 g./10 minutes according to ASTM–D–1238–57 T; grain size 300 to 500μ) prepared from 90 parts by weight of ethylene and 10 parts by weight of methacrylic acid, whose carboxyl groups were neutralized with sodium ions, and the mixture was then granulated. When this granulate was used for forming panels 60 x 60 x 1 mm. at a moulding temperature of 150° C. they proved to have good dimensional stability. Even only after 15 seconds in the mould the resulting panels had a density of 1.370.

The impact strength of the panels was tested by an indentation test, the panels under test being subjected to the impact produced by a dropping hammer sliding in friction-free rails onto the panels clamped in a frame. The point of the dropping hammer had a hemispherical shape of a radius of 10 mm. The hammer was dropped from different heights vertically, and at each height 10 panels were tested.

In a comparative test powdered polyethylene terephthalate, without addition of ionic copolymer, was mixed with 0.2% by weight of aluminium silicate powder (47% $SiO_2$, 38% $Al_2O_3$; 75% below 2μ grains), the mixture was homogenized in an extruder and then granulated. Processing and testing were performed as described above. The results of the indentation test are shown in Table 1.

EXAMPLE 2

3690 g. of polyethylene terephthalate powder (reduced specific viscosity 1.43 dl./g., measured in a 1% solution of 60:40 phenol+tetrachloroethane at 25° C.; grain size 100–750μ) were homogenized in an extruder with 40 g. of an ionic copolymer (melt index below 0.1 g./10 minutes according to ASTM–D–1238–57 T; grain size 300–500μ) prepared from 90 parts by weight of ethylene and 10 parts by weight of methacrylic acid, whose carboxyl groups had been neutralized with sodium ions, and then granulated. Further processing and testing were performed as described in Example 1. When the moulding composition was injected, a density of 1.366 was achieved after a mould time of only 15 seconds. The result of the indentation test is shown in Table 1.

EXAMPLE 3

High-pressure polyethylene, which had been grafted with 6% of acrylic acid, was neutralized with sodium hydroxide. 120 grams of this ionic copolymer (grain size about 500μ) were mixed with 3880 g. of polyethylene terephthalate powder (reduced specific viscosity 1.36 dl./g., measured in a 1% solution of 60:40 phenol+tetrachloroethane at 25° C.; grain size 200–700μ), then homogenized in an extruder and finally granulated. The further processing and testing were performed as described in Example 1.

In a comparative test the polyethylene terephthalate powder, without addition of ionic copolymer, was mixed with 0.2% by weight of aluminium silicate powder (47% $SiO_2$, 38% $Al_2O_3$); 75% grains below 2μ), the mixture was homogenized in an extruder and then granulated. The processing and testing were performed as described in Example 1. The results of the indentation test are summarized in Table 1.

TABLE 1

| Polyester | Admixed ionic copolymer | Addition in percent by weight | Drop F 20 in cm.* |
|---|---|---|---|
| Polyethylene terephthalate. | Copolymer of ethylene and methacrylic acid, containing Na-ions (Example 1). | 0.5 | 105 |
| Polyethylene terephthalate (Ex. 1). | | | 60 |
| Polyethylene terephthalate. | Copolymer of ethylene and methacrylic acid, containing Na-ions (Example 2). | 1 | 125 |
| Polyethylene terephthalate. | Graft polymer of ethylene and acrylic acid, containing Na-ions (Example 3). | 3 | 110 |
| Polyethylene terephthalate (Ex. 3). | | | 55 |

*Height at which the impact energy sufficed to break 20% of the panels.

What is claimed is:

1. Thermoplastic moulding compositions consisting essentially of a mixture of (a) linear saturated polyesters consisting essentially of terephthalic acid esters of diols selected from saturated aliphatic diols and cyclohexane 1,4-dimethylol, said polyesters having a reduced specific viscosity dl./g. of 0.6 to 2.0 as measured at a 1% concentration in a 60:40 mixture of phenol and tetrachloroethane at 25° C. and (b) ionic copolymers of alpha-olefins and sodium salts of alpha,beta-unsaturated carboxylic acids, which copolymers may optionally contain units derived from alpha,beta-unsaturated carboxylic acids and/or carboxylic acid esters, said copolymer containing by weight at least 50% alpha-olefin and at least 5% of said sodium salts, the ionic copolymer being used in an amount of from 0.5 to 3% by weight, based on the total weight of mixture and having a molecular weight of at least 5,000.

2. A thermoplastic moulding composition as claimed in claim 1, wherein polyethylene glycol terephthalate is used as linear saturated polyester.

3. A thermoplastic moulding composition as claimed in claim 1, wherein polycyclohexane-1,4-dimethylol terephthalate is used as linear saturated polyester.

4. A thermoplastic moulding composition as claimed in claim 1, wherein the linear saturated polyester has a reduced specific viscosity of from 0.9 to 1.6, measured from a 1% solution in a 60:40 mixture of phenol and tetrachloroethane at 25° C.

5. A thermoplastic moulding composition as claimed in claim 1, wherein the ionic copolymer is a copolymer of $\alpha$-olefins and sodium salts of $\alpha,\beta$-unsaturated dicarboxylic acids.

6. A thermoplastic moulding composition as claimed in claim 1, wherein the ionic copolymer has been prepared by grafting $\alpha,\beta$-unsaturated carboxylic acid esters on to polyolefins with subsequent saponification.

7. A thermoplastic moulding composition as claimed in claim 1, wherein the ionic copolymer has an olefin content of 80 to 99%.

8. A thermoplastic moulding composition as claimed in claim 1, wherein the ionic copolymer contains, in addition to the $\alpha$-olefin and the sodium salt of an $\alpha,\beta$-unsaturated carboxylic acid, an $\alpha,\beta$-unsaturated carboxylic acid and/or an $\alpha,\beta$-unsaturated carboxylic acid ester.

9. A thermoplastic moulding composition as claimed in claim 1, wherein the ionic copolymer contains ester units and the sum of the ester units and of the ionic units in the copolymer amounts to at least 10% by weight.

10. A thermoplastic moulding composition as claimed in claim 1, wherein at least 10% of the carboxyl groups of the ionic copolymer are neutralized by sodium ions.

11. A thermoplastic moulding composition as claimed in claim 1, wherein the ionic copolymer has a molecular weight above 50,000.

12. A thermoplastic moulding composition as claimed in claim 1, wherein the ionic copolymer is the copolymer of ethylene and the sodium salt of methacrylic acid.

13. Shaped articles made from a thermoplastic moulding composition as claimed in claim 1.

References Cited

UNITED STATES PATENTS

| | | | |
|---|---|---|---|
| 3,290,411 | 12/1966 | Tsuji et al. | 260—873 |
| 3,435,093 | 3/1969 | Cope | 260—857 |

FOREIGN PATENTS

| | | |
|---|---|---|
| 674,595 | 11/1963 | Canada. |

MELVIN GOLDSTEIN, Primary Examiner